United States Patent
Liao et al.

(10) Patent No.: US 9,477,134 B2
(45) Date of Patent: Oct. 25, 2016

(54) HYBRID INTEGRATION USING FOLDED MACH-ZEHNDER MODULATOR ARRAY BLOCK

(71) Applicant: Futurewei Technologies, Inc., Plano, TX (US)

(72) Inventors: Chunlei Liao, Santa Clara, CA (US);
Morgan Chen, San Jose, CA (US);
Xiao A. Shen, San Bruno, CA (US);
Yusheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 419 days.

(21) Appl. No.: 13/730,497

(22) Filed: Dec. 28, 2012

(65) Prior Publication Data

US 2014/0185978 A1 Jul. 3, 2014

(51) Int. Cl.
*G02F 1/035* (2006.01)
*G02F 1/225* (2006.01)
*G02F 1/00* (2006.01)
(Continued)

(52) U.S. Cl.
CPC ............. *G02F 1/225* (2013.01); *G02F 1/00* (2013.01); *G02F 1/21* (2013.01); *G02B 6/125* (2013.01); *G02B 2006/12104* (2013.01);
(Continued)

(58) Field of Classification Search
CPC .. G02F 1/00; G02F 1/2255; G02F 2001/212; G02F 1/225; G02B 6/125; G02B 2006/12142; G02B 2006/12159; G02B 2006/12104
USPC ......... 385/1–3; 359/237–238, 245–246, 248, 359/254–255
See application file for complete search history.

(56) References Cited

U.S. PATENT DOCUMENTS 7,079,718 B2 * 7/2006 Welch et al. .................. 385/14
7,212,326 B2 * 5/2007 Wooten et al. ............... 359/245
(Continued)

FOREIGN PATENT DOCUMENTS

| CN | 1874196 A | 12/2006 |
|---|---|---|
| JP | 2004287116 A1 | 10/2004 |
| WO | 2013113287 A1 | 8/2013 |

OTHER PUBLICATIONS

Foreign Communication From a Counterpart Application, PCT Application No. PCT/CN20131090646, International Search Report dated Mar. 27, 2014, 7 pages.
(Continued)

*Primary Examiner* — Ryan Lepisto
*Assistant Examiner* — Guy Anderson
(74) *Attorney, Agent, or Firm* — Conley Rose, P.C.; Grant Rodolph; Jonathan K. Polk

(57) ABSTRACT

An apparatus comprising a modulation block comprising a plurality of modulators, wherein each of the plurality of modulators comprises an optical input port and an optical output port, and wherein all of the optical input ports and all of the optical output ports are positioned on one face of the modulation block. Another apparatus comprising a modulation block comprising one or more Mach-Zehnder modulators (MZMs), wherein each MZM is coupled to an optical input port, an optical output port, and at least one electrical trace, wherein all of the optical input ports and all of the optical output ports are positioned on a first side of the modulation block, and wherein all of the electrical traces are positioned on a second side of the modulation block, and a planar lightwave circuit (PLC) coupled to the modulation block via an optical interface.

20 Claims, 6 Drawing Sheets

(51) Int. Cl.
*G02F 1/21* (2006.01)
*G02B 6/12* (2006.01)
*G02B 6/125* (2006.01)

(52) U.S. Cl.
CPC ........... *G02B 2006/12142* (2013.01); *G02B 2006/12159* (2013.01); *G02F 2001/212* (2013.01)

(56) References Cited

U.S. PATENT DOCUMENTS

| | | | |
|---|---|---|---|
| 7,636,522 B2* | 12/2009 | Nagarajan et al. | 398/79 |
| 7,826,689 B2* | 11/2010 | Sugiyama | G02F 1/035 385/2 |
| 8,233,752 B2* | 7/2012 | Ide et al. | 385/3 |
| 8,463,088 B1* | 6/2013 | Asghari et al. | 385/14 |
| 2003/0205794 A1 | 11/2003 | Lee et al. | |
| 2004/0156580 A1* | 8/2004 | Baumann | G02B 6/12007 385/16 |
| 2004/0240765 A1* | 12/2004 | Wooten et al. | 385/2 |
| 2005/0069240 A1* | 3/2005 | Griffin et al. | 385/3 |
| 2005/0213863 A1* | 9/2005 | Sugiyama et al. | 385/2 |
| 2006/0034569 A1* | 2/2006 | Shih | G01D 5/35383 385/39 |
| 2006/0210216 A1* | 9/2006 | Lee et al. | 385/14 |
| 2007/0242919 A1* | 10/2007 | Welch | B82Y 20/00 385/14 |
| 2007/0280704 A1 | 12/2007 | Fitzgerald et al. | |
| 2008/0056638 A1* | 3/2008 | Glebov et al. | 385/9 |
| 2008/0118202 A1* | 5/2008 | Kato et al. | 385/14 |
| 2008/0158643 A1 | 7/2008 | Adamiecki et al. | |
| 2010/0006784 A1* | 1/2010 | Mack et al. | 250/551 |
| 2010/0232462 A1 | 9/2010 | Shen et al. | |
| 2010/0254420 A1* | 10/2010 | Corzine et al. | 372/38.04 |
| 2011/0085572 A1* | 4/2011 | Dallesasse et al. | 372/20 |
| 2011/0116738 A1* | 5/2011 | Watanabe | 385/14 |
| 2011/0142457 A1* | 6/2011 | Betty et al. | 398/214 |
| 2011/0267676 A1* | 11/2011 | Dallesasse et al. | 359/279 |
| 2012/0099611 A1* | 4/2012 | Kim et al. | 372/20 |
| 2012/0106984 A1* | 5/2012 | Jones | H04L 27/223 398/214 |
| 2012/0148241 A1* | 6/2012 | Piehler | H04Q 11/0067 398/49 |
| 2012/0207474 A1* | 8/2012 | Inoue | H04B 10/60 398/65 |
| 2013/0107901 A1* | 5/2013 | Deppe | G02B 6/12004 372/36 |
| 2013/0202312 A1* | 8/2013 | Shen et al. | 398/138 |

OTHER PUBLICATIONS

Foreign Communication From a Counterpart Application, PCT Application No. PCT/CN2013/090646, Written Opinion dated Mar. 27, 2014, 5 pages.
"Arrayed Optical Device Block for Photonic Integration"; U.S. Appl. No. 13/364,937, filed Februrary 2, 2012; Specification and Drawings; 26 pages.
Saleh et al.; "Fundamentals of Photonics"; John Wiley & Sons, Inc., 23 pages.
Han et al.; "Efficient Electrooptic Modulator in InGaA1As/InP Optical Waveguides"; IEEE Photonics Technology Letters, vol. 5, No. 1, Jan. 1993; pp. 46-49.
Evans et al.; "10-Channel x 40Gb/s per channel DQPSK Monolithically Integrated InP-based Transmitter PIC", PDP18.pdf, OFC/NFOEC 2008; 3 pages.
Wooten et al.; "A Review of Lithium Niobate Modulators for Fiber-Optic Communications Systems"; IEEE Journal of Selected Topics in Quantum Electronics, vol. 6, No. 1, Jan./Feb. 2000; pp. 69-82.
Kaplan et al.; "LiNbO3 Integrated Optical QPSK Modulator and Coherent Receiver"; 4 pages.
"Hitachi Chemical Substitute Connection Film for Solder, Connector, MF-331," Hitachi Chemical Data Sheet, Revised on Nov. 19, 2009, 8 pages.
Partial English Translation and Abstract of Japanese Patent Application No. JP2004287116, Part 1, Nov. 15, 2015, 6 pages.
Partial English Translation and Abstract of Japanese Patent Application No. JP2004287116, Part 2, Nov. 15, 2015, 3 pages.
Doerr, C.R., et al., "Simple multi-channel optical equalizer for mitigating intersymbol interference," TriQuint Semiconductor, Mar. 23, 2003, 3 pages.
Stahl, D., et al., "Extending the chromatic dispersion tolerance by optical equalization at 43 Gb/s," Optical Fiber Communication Conference, Feb. 23, 2004, 3 pages.
Foreign Communication From a Counterpart Application, European Application No. 13868232.3, Extended European Search Report dated Nov. 3, 2015, 9 pages.

\* cited by examiner

HYBRID INTEGRATION USING FOLDED MACH-ZEHNDER MODULATOR ARRAY BLOCK

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Conventional dense wavelength division multiplexing (DWDM) systems employ a laser in combination with a series of modulators, which may serve the function of manipulating the amplitude, phase, and/or frequency of the laser to create an optical signal based on a received electrical signal. Multiple modulators may be employed to multiplex several different electrical signals, such as radio frequency (RF) signals, onto a single optical signal by employing each modulator or modulator pair, depending on implementation, to alter a specific wavelength of light. The resulting optical signal may then be placed on an optical fiber for transmission.

One approach to creating a transmitter for use in a DWDM system is to use discrete modulators. However, this implementation method may need a complex and expensive transmitter architecture encompassing a large number of optical functions and elements. This complexity problem has led to research into large-scale photonic integration, which would allow the integration of multiple optical functions and wavelength channels onto a single device or block (sometimes also referred to as a circuit component). The integrated approach may reduce architecture complexity, increase system reliability, and reduce system power consumption compared to systems employing discrete optical components.

A Mach-Zehnder modulator (MZM) based on a Mach-Zehnder interferometer may be a key component for high-speed optical transmitters and is frequently used in DWDM networks. The MZM may be made up with waveguides in a good optical material, whose refractive index may be altered by applying an electric field on one or two arms of the interferometer. Intensity and/or phase modulation may be obtained by creating phase differences between two arms. Depending on the overall phase difference, the output light recombines more or less efficiently, or does not recombine at all, at the output of the interferometer, conducting to a modulation of the output power. The MZM may be combined with a continuous wavelength (CW) laser in a transmitter to allow precise manipulation of optical signals in both amplitude and phase. As the advent of coherent optical communications, MZM may become more important as it is a reliable modulating device capable of supporting coherent technologies.

Traditional MZMs may typically be made of lithium niobate (e.g., LiNbO3). However, lithium niobate is highly anisotropic, which requires its input ports to be positioned in the opposite direction from its output ports. Further, the anisotropic nature of a traditional MZM may prevent significant on-chip waveguide bending. The design constraints have forced all previous attempts at large scale photonic integration to rely on a monolithic architecture. The monolithic structure may require routing of incoming electrical signals related to the MZMs at the center of the monolith, which may become very complex given a relatively high number of MZMs integrated. This in turn creates an upper limit on the number of channels available to a monolithic system. In high-speed systems, the difference in length between the simple short routing to the outer MZMs when compared to the longer complex routings to the inner MZMs may also cause a difference in the propagation of the associated electrical signals. The difference in propagation delay needs to be considered by other components of the system, creating further system complexity and potential increase in cost.

SUMMARY

In one embodiment, the disclosure includes an apparatus comprising a modulation block comprising a plurality of modulators, wherein each of the plurality of modulators comprises an optical input port and an optical output port, and wherein all of the optical input ports and all of the optical output ports are positioned on one face of the modulation block.

In another embodiment, the disclosure includes an apparatus comprising a modulation block comprising one or more MZMs, wherein each MZM is coupled to an optical input port, an optical output port, and at least one electrical trace, wherein all of the optical input ports and all of the optical output ports are positioned on a first side of the modulation block, and wherein all of the electrical traces are positioned on a second side of the modulation block, and a planar lightwave circuit (PLC) coupled to the modulation block via an optical interface.

In yet another embodiment, the disclosure includes a method implemented by an optical modulator comprising receiving an optical signal via an optical input port in a first direction, receiving an radio frequency (RF) input signal, modulating the optical signal using the RF input signal to generate a modulated optical signal, and transmitting the modulated optical signal via an optical output port in a second direction, wherein an angle between the first and second directions is greater than 135 degrees.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are apparatuses and methods for large-scale hybrid photonic integration. In embodiments of this disclosure, a modulation comprising a plurality of MZMs may be constructed using a Group III-V compound, such as Indium Phosphide (InP). The plurality of MZMs may have all of their optical input ports and optical output ports positioned on one face of the modulation block, and all of their electrical traces positioned on a different face of the modulation block. In an embodiment, a waveguide connected to each optical output port may be folded or bent, enabling an incoming electrical signal to propagate in a direction substantially parallel to the optical signal being modulated. Moreover, the modulation block may be coupled via an optical interface to a planar lightwave circuit (PLC), which may comprise a passive optical network component. Further, the PLC may be monolithically grown on a PLC carrier based on a silica-on-silicon (SOC) chip. The modulation block may be coupled to the PLC carrier via electrical, mechanical, and/or thermal interfaces. In an embodiment, the modulation may be bonded onto the PLC carrier using a flip-chip method.

Figure 1:
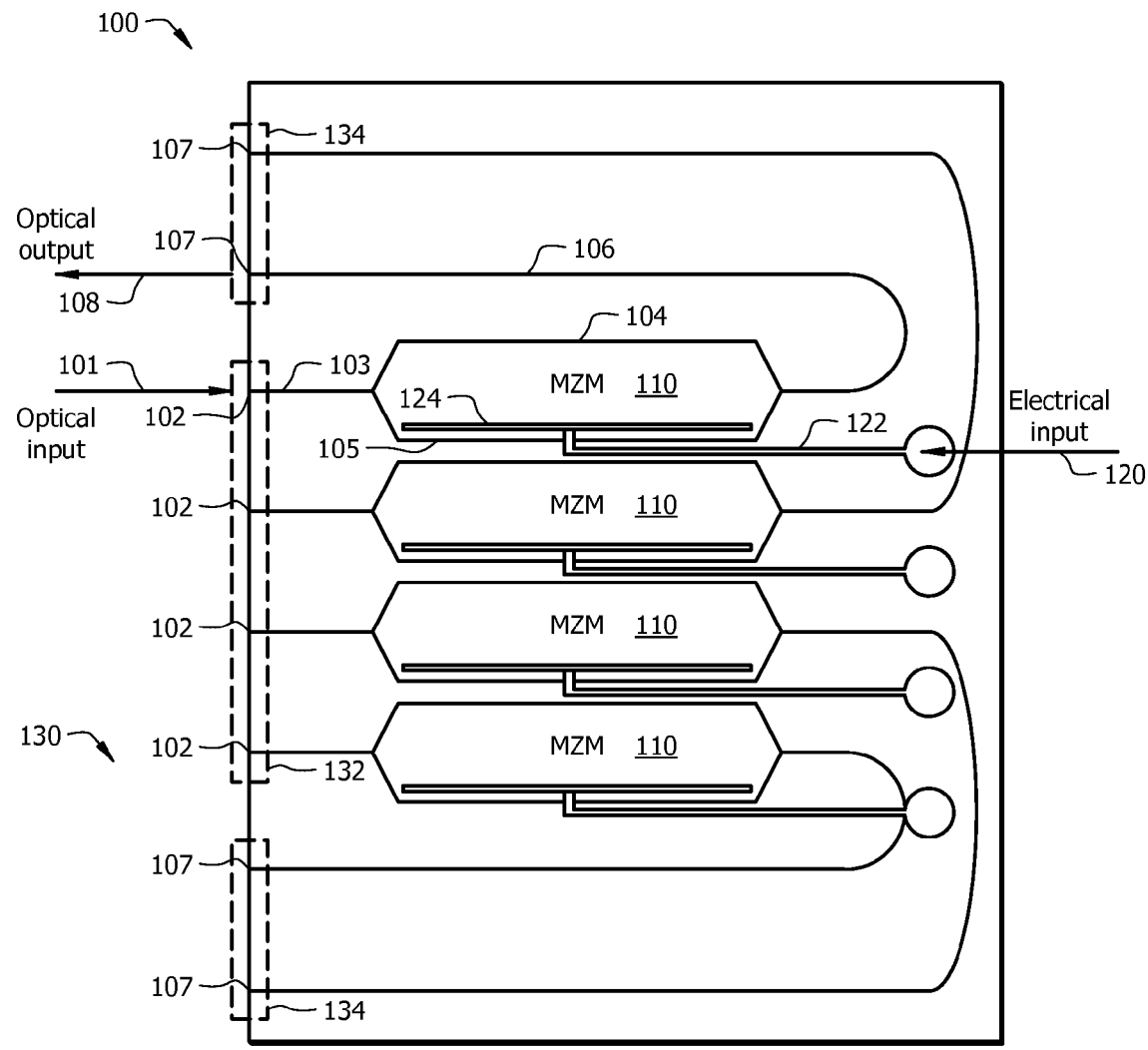
FIG. 1 is a schematic diagram of an embodiment of an optical modulation block.

FIG. 1 is a schematic diagram of an embodiment of a modulation block 100 comprising an MZM array. The term "block" herein may refer to an object, device, unit, or entity that is separate from other objects (at least at a time when the object is first fabricated), thus merely a section or portion of the object (e.g., a left section or a right section as may be arbitrarily defined) may not be regarded as a block. FIG. 1 may be considered a top view of the modulation block 100, assuming that a carrier or platform is situated underneath the modulation block 100. As used herein, "top", "bottom", "front", "back", "left", "right", "inner", "outer", or any other term that references a relative position is with respect to the perspective view referenced and does not mean to imply that a device is restricted to only one orientation.

The modulation block 100, sometimes also referred to as an active circuit component, may comprise one or more MZMs 110 or other type of optical modulators, each having an optical input port 102 and an optical output port 107. Consider, for example, one MZM 110 located on top of the MZM array, with the premise that all other MZMs 110 may be configured similarly. The MZM 110 may be used to modulate the phase and/or amplitude of an optical signal. Specifically, the MZM 110 may be configured to receive an optical input signal 101 via an optical input port 102. The optical input signal 101 may be an un-modulated photonic beam, such as laser light, or a pre-modulated signal from a laser or other photonic network component. The optical input signal 101 may pass along a waveguide 103 through the optical input port 102. Then, the optical input signal 101 may be split into two parts or portions, e.g., by a 1:2 multi-mode interference (MMI) splitter. A first portion and a second portion may then pass through a waveguide 104 and a waveguide 105, respectively.

In addition, the MZM 110 may also be configured to receive an electrical input signal 120, which may be a radio frequency (RF) signal. The electrical input signal 120 may be delivered via a transmission line 122 to an electrode 124, which may be positioned beneath and close to the waveguide 105. The electrode 124 may reside on the surface of the modulation block 100 (e.g., having roughly the same length as the waveguide 105), and the transmission line 122 may reside on a carrier underneath the modulation block 100. The transmission line 122 may be coupled to the electrode 124 via solder or other suitable electrical attachment. Although the electrode 124 and the transmission line 122 are portrayed as beside the waveguide 105 for visual purposes, in practice they may be positioned substantially underneath (e.g., vertically overlapping with) the waveguide 105. One skilled in the art will recognize that, for proper transfer of the electrical input signals 120, the electrode 124 may be further connected to an electrical output, which may be connected to a common ground or to another component. To reduce visual complexity, in FIG. 1 and all subsequent figures, unless pointed out otherwise, locations of the electrical outputs, the common ground, and transmission lines coupled to the ground have been omitted.

In operation, the electrical input signal 120 may induce a change in the refractive index of the waveguide 105. Consequently, as the second portion of the optical input signal passes through the waveguide 105, its phase may be altered. Then, the second portion of the optical input signal may be combined with the first portion of the optical input signal in the waveguide 104, e.g., by a 2:1 MMI coupler or combiner. The two portions may combine to form an optical output signal 108 that is modulated by the electrical input signal 120. Depending on the electrical input signal 120, the optical output signal 108 may have an amplitude higher than, equal to, or lower than the optical input signal 101. The optical output signal 108 may then propagate in a waveguide 106 to the optical output port 107 and be transmitted to other components.

Although the waveguides 103, 104, 105, and 106 are described above as separate waveguides, it should be understood that they may also be considered different sections or branches of one waveguide. Moreover, the waveguides 103, the waveguide 106, and the electrode 124 may be considered part of the MZM 110 or coupled to the MZM 110. Further, although only one arm (e.g. the waveguide 105) of the MZM 110 is modulated in FIG. 1, one skilled in the art will recognize that, depending on the application, both arms of the MZM 110 may be modulated as well. For example, two electrical input signals fed to the two arms may have opposite polarity, such that the modulation effect may be strengthened.

Regarding the modulation block 100 as a whole, the multiple MZMs 110 may be positioned substantially in parallel to form an array configuration. In an embodiment, all of the optical input ports 102 and all of the optical output ports 107 may be positioned on a first face or side 130 of the modulation block 100. As shown in FIG. 1, the face 130 may be considered a left face of the modulation block 100. For each MZM 110, since the optical input port 102 and the optical output port 107 are positioned on the same side, a waveguide needs to be redirected or bent either before entering or after exiting the two arms of a MZM. As shown in FIG. 1, the waveguides 106 connected to the optical output ports 107 are bent (e.g., after existing two arms), which may be referred to sometimes as a lumped configuration. In an embodiment, the waveguide 106 may be bent at least 120 degrees, at least 135 degrees, or at least 160 degrees (e.g., 180 degrees to reverse direction). Further, the face 130 of the modulation block 100 may comprise a center portion 132 and at least one outer portion 134 (two are shown in FIG. 1). As shown in FIG. 1, the optical input ports 102 are positioned in the inner portion 132 and the optical output ports 107 are positioned in the two outer portions 134. Alternatively, all of the optical output ports 107 may be positioned in only one outer portion 134. For example, the center portion 132 may be a top part of the face 130, and the outer portion may be a bottom part of the face 130.

In an embodiment, all electrical traces or patterns, such as electrical input ports, transmission lines, electrodes, electrical outputs, may be positioned on a second side or face of the modulation block 100. The second side face may be considered a bottom face of the modulation block 100. Positioning the electrical traces on a different side of the modulation block 100 from the optical input/output ports may reduce the need for complex routing of electrical traces, since the electrical traces may not vertically overlap with optical waveguides anymore. Specifically, such positioning allows for simple electrical signal routing which reduces complexity and allows for relatively uniform electrical path length. Uniform electrical path length further reduces complexity by ensuring relatively uniform electrical signal propagation delay, thereby reducing or eliminating the need for devices to compensate for differing propagation delay on different electrical paths.

Overall, the modulation block 100 is configured to receive optical input signals 101 through optical input ports 102, modulate intensity of the signals via the MZMs 110, redirect those signals about 180 degrees, and transmit the optical output signals 108 through the optical output ports 107 to other components or devices. One skilled in the art will recognize that, while four MZMs 110 are shown in the optical device array, any number of MZMs 110 may be used. For photonic integration applications, MZMs 110 may often be employed in multiples of two, multiples of four, multiples of eight, and so forth.

Isotropic materials are employed to allow optical signals to be bent at relatively sharp angles in a small area on a circuit component. Using this property, the devices disclosed herein have both optical inputs and optical outputs positioned on the same side of the circuit component. The optical inputs may be modulated using MZMs to create optical signals which may be multiplexed with other signals or otherwise employed by other related components. An optical medium used to channel the waveguides discussed herein may comprise any appropriate isotropic material. In an embodiment, the optical medium may comprise a Group III-V compound, such as Indium Phosphide (InP) or Gallium Arsenide (GaAs). Compared to MZMs based on lithium niobate, which is a material commonly used to construct MZMs, MZMs based on a Group III-V compound may possess some unique features. For example, the size or dimensions of the MZM may be constructed smaller, which may be desirable for large-scale photonic integrations. MZM made of InP may be especially small, due to its use of a quantum-confined Stark effect. Exemplary dimensions (length, width, or height) of the modulation block 100, which has four lumped MZMs, are about a few (e.g., 2-10) millimeters. Note that any other size may be realized depending on the application and fabrication technologies. For another example, MZMs based on a III-V compound may be built into a basic building block with a single optical interface, including optical inputs and outputs, for easy alignment in hybrid photonic integration. The single-interface block may offer a high yield when integrated onto a PLC.

The configuration of the modulation block 100 and its variations may be attractive in coherent communications and high-density multi-channel DWDM applications. For example, in polarization-multiplexed quadrature phase-shift-keying (PM-QPSK) applications, each laser may require four parallel MZMs, with two for the X-polarization and two for the Y-polarization. Each polarization has one MZM for in-phase modulation and one MZM for quadrature modulation. For another example, in high-port-density and massively-parallel DWDM applications, such as photonic integrated circuit (PIC) and photonic integrated device (PID), increasing data rate per-wavelength beyond 10 gigabits per second (Gbps) as well as their reach may require the integration of a large number of MZMs in parallel. The embodiments discussed herein may be used to create a PID and/or a PIC. A PID may be a PIC that is integrated in a non-monolithic fashion. Basic building blocks, such as the modulation block 100, may offer an excellent foundation for PIC/PID to grow.

A method is described herein for hybrid integration of modulation blocks, which may be made of compound materials (e.g., InP), with a silica-on-silicon (SOS) carrier. The SOS carrier may also serve as a passive part of the integrated device. The integrated device may work as any appropriate optical device, such as a coherent modulator, a coherent transmitter, a parallel on-off keying (OOK) modulator array, a parallel OOK transmitter array, or combinations thereof. In an embodiment, a flip-chip approach may be used for the hybrid integration. Alternatively, a Butt joint method may be used, which may achieve active alignment of the modulation block relative to the SOS carrier.

Figure 2:
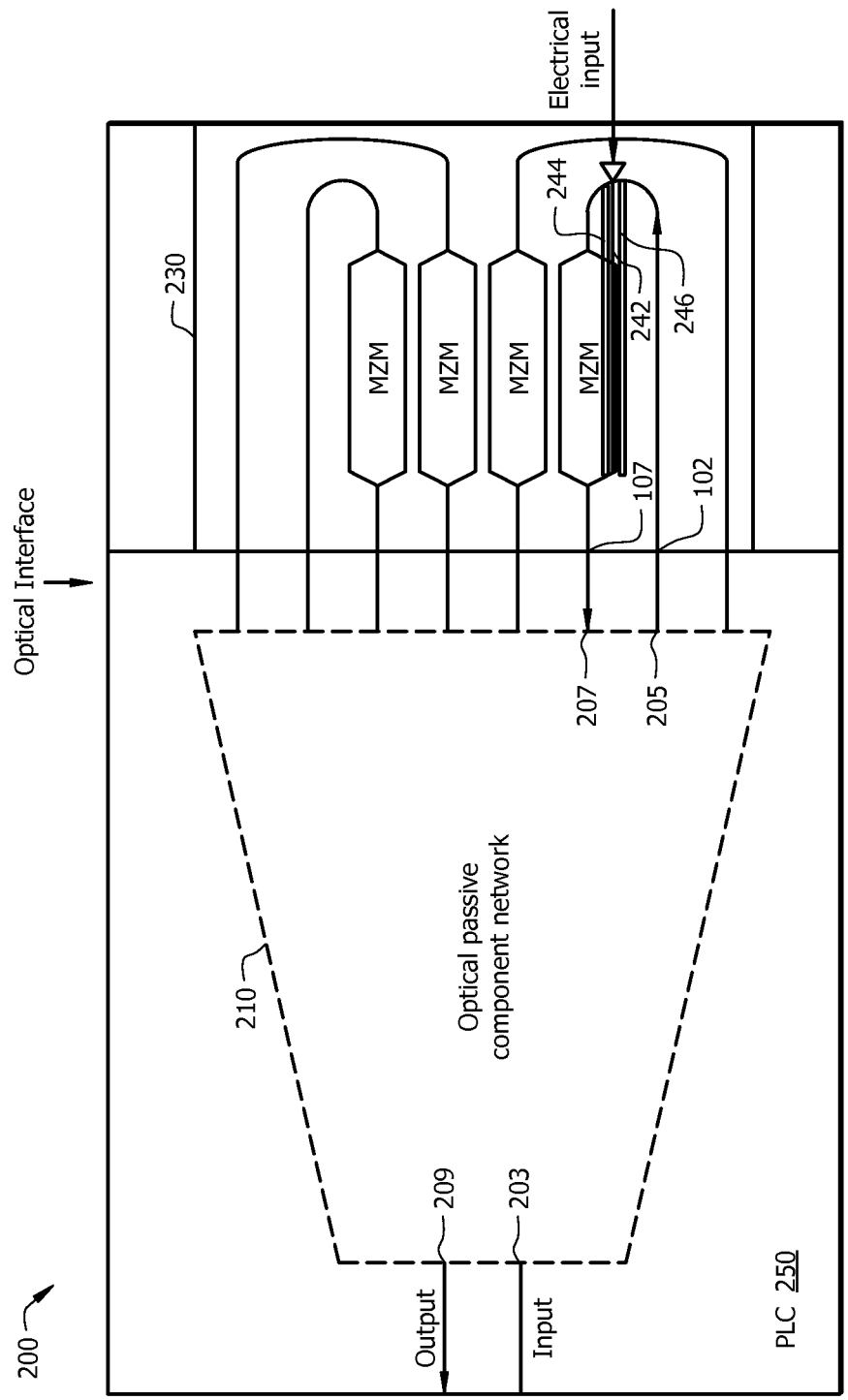
FIG. 2 is a schematic diagram of an embodiment of an optical assembly.

FIG. 2 is a schematic diagram of an embodiment of an assembly 200 comprising a passive optical network component 210 coupled to a modulation block 230 via an optical interface. Specifically, the passive optical network component 210 may be monolithically grown on a PLC carrier 250. Note that other type of optical components may also be grown on the PLC carrier 250 and coupled to the modulation block 230. The passive optical network component 210 may be a PLC or part of a PLC. Alternatively, sometimes both the passive optical network component 210 and the PLC carrier 250 may be considered a PLC. The modulation block 230, e.g., made of InP, may be bonded to the PLC carrier 250 (e.g., via flip-chip bonding). An electrical interface may be formed between the modulation block 230 and the PLC carrier 250.

The passive optical network component 210 is configured to perform processing and/or transmission of an optical signal. The passive optical network component 210 may comprise one or more inputs 203 on a first end and one or more corresponding optical output ports 205 on a second end (only one 203 and one 205 labeled for illustration). The passive optical network component 210 may receive an optical or other input, perform any appropriate processing, and transmit one or more optical signals to the optical output ports 205. The optical output ports 205 may be aligned with or coupled to the optical input ports 102 of the modulation block 230. The optical signals may then be received by the optical input ports 102, modulated by MZMs in the modulation block 230, and transmitted via the optical output ports 107 back to the passive optical network component 210.

The passive optical network component 210 may further comprise one or more optical input ports 207 on the second end and one or more corresponding output ports 209 on the first end. The optical input ports 207 may be aligned with the optical output ports 107 and accept optical signals from the optical output ports 107. After processing by the passive optical network component 210, an optical input signal may be converted to a processed signal (optical or other type), which may then be transmitted to external components via the output ports 202. One skilled in the art will recognize that the passive optical network component 210 or other components may be optically coupled to the various embodiments of the modulation block 230 by butt joint, flip chip, or other methods. One skilled in the art will recognize that it is possible to integrate other optical components such as semiconductor optical amplifiers (SOA) with the various embodiments discussed herein. The SOAs may be used to boost output signal intensity to or from the modulation block 200. The SOA may be located along an optical input port 102 waveguide, optical output port 107 waveguide, or both.

Various aspects of the modulation block 230 (e.g., working principle of MZMs, material, and size) may be substantially similar to the modulation block 100, thus in the interest of conciseness, further descriptions may focus on the aspects that are different. Unlike the modulation block 100 which is configured to redirect optical input signals after modulation, the modulation block 230 is configured to redirect optical input signals prior to modulation (sometimes referred to as a folded configuration). In the modulation block 230, the waveguide connected to the optical input ports 102 is bent or folded at least 120 degrees, at least 135 degrees, or at least 160 degrees (e.g., about 180 degrees to reverse direction). In other words, a light path of optical input signals are redirected at least 120 degrees, at least 135 degrees, or at least 160 degrees.

Consider the operation of one MZM as an example, with the premise that other MZMs may be similarly configured. In operation, an electrical input signal (e.g., a RF signal) may feed into the wire-bonding pad 240, which is connected to a transmission line 242. The electrical input signal may propagate along the transmission line 242 (e.g., underneath the MZM modulation arm) with one or more ground lines, such as a first ground line 244 and a second ground line. Electrical connections are only shown for one MZM, but it should be understood that the other MZMs also have similar corresponding electrical connections. Since in the folded configuration, the optical input signal has already been redirected when arriving at the MZM modulation arm (vertically overlapping the transmission line 240), the optical input signal may propagate in the same direction as the electrical input signal propagates in the transmission line 240. For high-speed systems, the modulation block 230 may be beneficial because the MZMs are arranged in a way such that the optical signals inside the MZMs propagate in the same direction as the electrical input signals, thereby increasing the effective interaction length between the signals for efficient high-speed modulation. The traveling-wave approach used in the modulation block 210 may provide relatively higher modulation bandwidth than the lumped modulation block 100 shown in FIG. 1.

To properly operate a MZM using a traveling-wave approach (e.g., as shown in FIG. 2), it may be desirable to have minimal RF reflection in the electrical circuit. A high amount of RF reflection may destabilize the operation of a RF signal source providing the RF signal and/or corrupt signal fidelity by adding reflected out-of-phase artifacts to the signal path, thereby reducing an operation bandwidth (e.g., a frequency range of optical modulation). In use, RF reflections in a high-speed electro-optic device may be caused by an impedance mismatch. In general, an impedance mismatch may indicate that a load (e.g., the transmission line 240) has an impedance different from the electrical signal source. Note that the signal source may include not only the RF signal source, but also connector(s) and other electrical signal sources, but not the load (e.g., the transmission line 240). Thus, to minimize the RF reflection in each MZM, RF termination resistors with appropriate values may be incorporated to the assembly 200.

Termination resisters may be deposited and patterned onto the surface of either the modulation block 230 or the PLC carrier 250. In practice, it may be undesirable to deposit the termination resistors on the modulation block 230. For example, a termination resistor may generate additional heat as modulation current flows in it, leading to a temperature increase in the modulation block 230. Since the performance of the modulation block 230 may strongly depend on its temperature, the temperature increase may cause decrease in performance. For another example, depositing and patterning termination resistors on the surface of the modulation block 230 may require additional patterning masks (e.g., lithography masks), increase architecture complexity, and increase manufacture cost. Moreover, the termination resistors on the modulation block 230 may also take additional space in a highly integrated MZM array.

Figure 3:
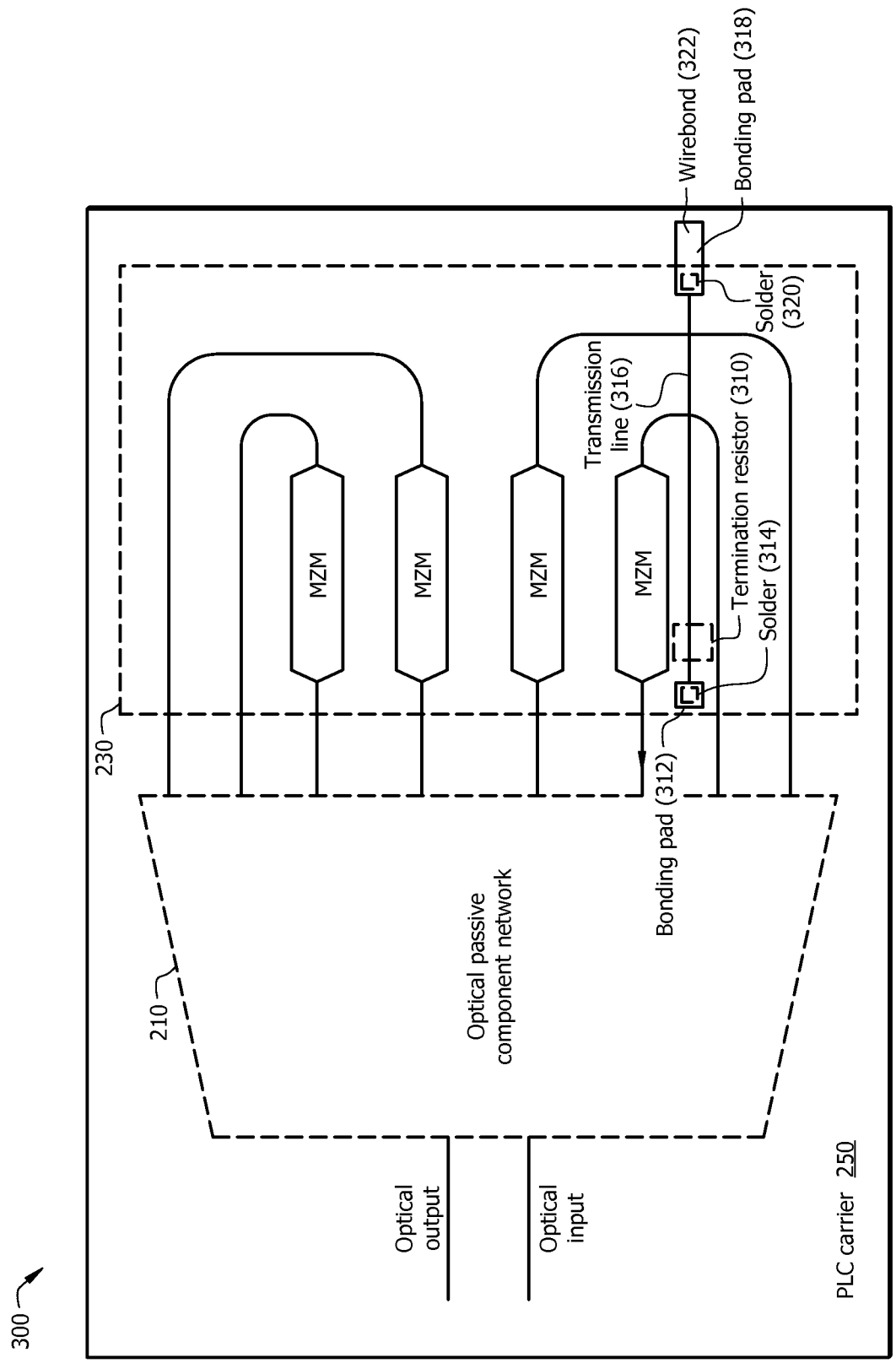
FIG. 3 is another schematic diagram of an embodiment of an optical assembly.

FIG. 3 is a schematic diagram of an embodiment of an assembly 300, which may be substantially similar with the assembly 200 in FIG. 2, except that FIG. 3 highlights RF connections of the assembly. In an embodiment, termination resisters 310 are deposited on the PLC carrier 250, which resides underneath the modulation block 230. For each MZM, there may be a termination resistor 310 located on the PLC carrier 250. The termination resistor 310 may be connected to a bonding pad 312, which is also located on the PLC carrier 250. The bonding pad 312 may be coupled via a solder 314 to a transmission line 316, which is located on the modulation block 230. As shown in FIG. 3, there may be another bonding pad 318 located on the PLC carrier 250 and coupled to the transmission line 316 via another solder 320. The solders 314 and 320 may comprise any fusible metal or metallic alloy used to join metal work pieces and having a melting point below that of the work piece(s). Exemplary soldering materials include, tin, copper, silver, bismuth, indium, zinc, antimony, and any combination thereof. Part of the bonding pad 318 may also serve as a wire bond or wire-bonding pad 322, through which an electrical signal travels to reach the transmission line 316. The electrical signal may propagate along the transmission line 316, then go to the termination resistor 310, and eventually to a common ground coupled to the termination resistor 310. Although the transmission line 316 is portrayed as beside the modulation MZM arm for visual purposes, in practice, the transmission line 316 may be positioned substantially underneath (e.g., vertically overlapping with) the waveguide 105. In an embodiment, the impedance of each termination resistor 310 is designed to match the impedance of the RF signal source. As a result, any remaining RF power in the back end of the electrical circuit may be minimized or eliminated, without causing noticeable perturbation to the operation. Moreover, the termination resistor 310 may be made by any suitable technique, e.g., by thick-film or thin-film technologies.

Further, in hybrid integration, the modulation block 230 may be placed at an edge of the PLC carrier 250, that is, not on top of any optical component or PLC. For high-speed modulation, e.g., at 25 gigahertz (GHz), it may be desirable to minimize the length of a RE connection between the wire bond 322 and the wall of a device package. The device package encompasses the assembly 300 and connects to external circuitry, e.g., via pins. As shown in FIG. 3, the wire bond 322 may be positioned at or near the edge of the modulation block 230 (away from the passive optical network component 210). Thus, the RF connection to the wall of device package may be made as short as possible.

Figure 4:
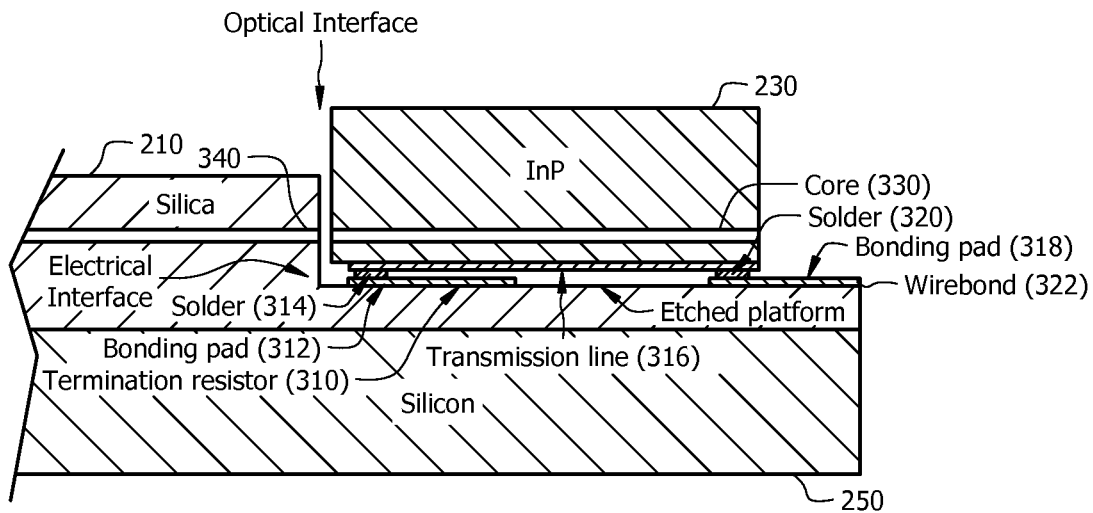
FIG. 4 is a schematic diagram showing an electrical interface and an optical interface between a modulation block and a PLC carrier.

In an embodiment, the modulation block 230 and the PLC carrier 250 may be integrated using a flip-chip bonding method. FIG. 4 illustrates an electrical interface and an optical interface between the modulation block 230 and the PLC carrier 250. FIG. 4 may be considered a front side cross-sectional view of the assembly 300. The wire bond 322 may serve as a contact point to a RF input signal. The wire bond 322 may be part of the bonding pad 318 or may be connected to the bonding pad 318, e.g., via a gold strip. The wire bond 322 and the bonding pad 318 may be two ends of a single metal pad (e.g., made of gold). The bonding pad 318 is coupled to one end of the signal trace or transmission line 316 on the modulation block 230 via the solder 320. Another end of the transmission line 316 may be coupled to the bonding pad 312 via the solder 314. The bonding pad 312 is connected to the termination resister 310, which may be coupled to a common ground via a ground line (not shown in FIG. 4). During modulation, a RF signal may first be fed from a wall of the package body via the wire bond 322 to the transmission line 316. The transmission line 316 may be positioned underneath and close to a core 330, which is an arm of a MZM. Optical signals passing through the core 330 may be modulated in intensity and/or phase. In use, the transmission line 316 may comprise a relatively wider portion, which serves as a bonding pad to form an electrical connection between the modulation block 230 and the PLC carrier 250. The electrical connection may be achieved by solder jointing of bonding pads located on both the modulation block 230 and the PLC carrier 250. Any remaining RF power may be largely absorbed by the termination resistor 310 on the PLC carrier 250, as the electrical path may be designed to minimize impedance mismatch and optimize electrical signal propagation. It should be understood that, in some embodiments (e.g., the lumped configuration in FIG. 1), no termination resister may be needed in the electrical circuit. Although construction of an assembly may be simpler in this case, the modulation bandwidth may be relatively narrower.

The optical interface between the modulation block 230 and the passive optical network component 210 may be formed by aligning the core 230 with a core 240. The cores 230 and 240 may be waveguides described previously. During fabrication of the device assembly, to vertically align the two cores, the PLC carrier 250 may be partially etched so that the waveguide cores 230 and 240 in the modulation block 230 and the passive optical network component 210 may be aligned at an equal height, as shown in FIG. 4. As the PLC carrier 250 may be a silica-on-silicon (SOS) carrier, it may have silica (e.g., $SiO_2$) on top and silicon at bottom. Etching does not have to reach the silicon layer.

Figure 5:
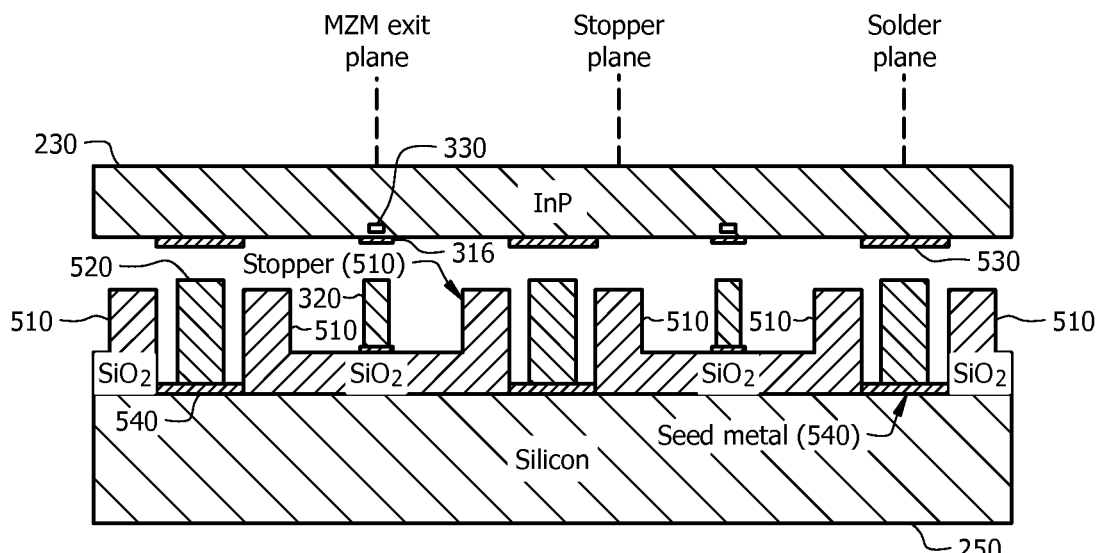
FIG. 5 is another schematic diagram showing an interface between a modulation block and a PLC carrier.

FIG. 5 is another schematic diagram showing an interface between the modulation block 230 and the PLC carrier 250 formed via flip-chip bonding. FIG. 5 may be considered a right side cross-sectional view of the assembly 300 (e.g., a view parallel to the optical interface in FIG. 4). As shown in FIG. 5, the vertical alignment may be obtained through a number of protruding features 510 on the PLC carrier 250, which may be referred to herein as stoppers 510. During fabrication, the stoppers 510 may be created via silica etching on the PLC carrier 250. For a stopper 510, its two sides may have different etching depths, e.g., with one side relatively shallower and another side relatively deeper. The shallower side may be designed to support electrical traces or patterns. For example, a shallower side may support a bonding pad 318, which may be connected to a transmission line 316 via a solder 320. As the bonding pad 318 may be made of gold, which may have good adhesion to silica but poor adhesion to silicon, it may be desirable to leave a layer of silica between the bonding pad 318 and the silicon layer of the PLC carrier 250. On the other hand, the deeper side may be etched all the way to the silicon layer and may be designed to provide mechanical support for the modulation block 230. For example, a solder 520 may couple two bonding pads 530 and 540 together forming a mechanical and thermal interface. The bonding pad 540 may be deposited on the silicon surface, thus the bonding pad 540 may comprise metals which has good adhesion to silicon. In an embodiment, mechanical coupling between the modulation block 230 and the PLC carrier 250 may be achieved in area where there is no direct contact to any MZM arm or electrode. This design may minimize or reduce any stress/strain induced birefringence as a result of the bonding, while keeping the mechanical/thermal characteristics of the interface uncompromised.

Figure 6:
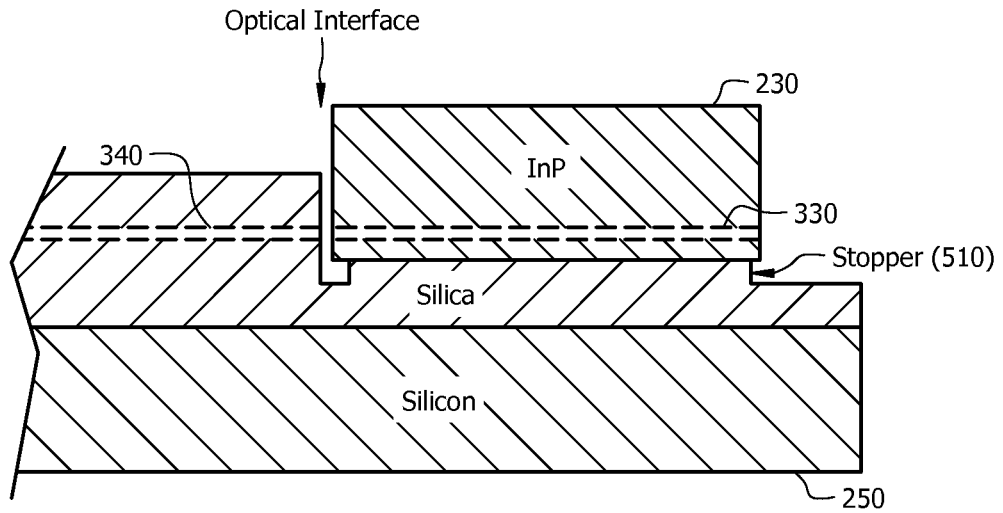
FIG. 6 is another schematic diagram showing a cross-sectional view of an assembly.

FIG. 6 is another view taken along the stopper plane shown in FIG. 5. As shown in FIG. 6, vertical alignment between the modulation block 230 and the PLC carrier 250 may be obtained through a number of stoppers 510 (only one shown in FIG. 6). The stoppers 510 may extend from an optical interface between the waveguide cores 330 and 340 to the other side of the modulation block 230. In a PLC wafer etching process, the depth of silica etching may be precisely controlled. The stoppers 510 may be positioned a few (e.g., 2-10) micrometers below the center of the waveguide core 330 in the modulation block 230. To align the waveguide core 330 with another waveguide core 340 (e.g., in the passive optical network component 210 or in another modulation block), the depth of the waveguide core 330 (e.g., distance of the core 330 to the bottom surface of the modulation block 230 in FIG. 6) may determine the height of the stoppers 510. Furthermore, during flip-chip bonding, the modulation block 230 may be pressurized until it rests on the stoppers 510. A typical precision of passive alignment in the vertical direction using the stoppers 510 may be less than 1 micrometer.

Horizontal alignment of the modulation block 230 with respect to the PLC carrier 250 may be accomplished using markers on both the modulation block 230 and the PLC carrier 250. The markers on the modulation block 230 may be generated during fabrication of the core 330 (etching inside InP), and the markers on the PLC carrier 250 may be generated during fabrication of the stoppers 510. Markers on both devices may be placed near the optical interface area for easy alignment. In addition, to an extent, soldering may also help horizontal alignment of the PLC carrier 250 and the modulation block 230, since horizontal movement may be driven by a surface tension force in an effort to minimize the surface area to reaching the lowest total surface energy of the assembly.

Figure 7:
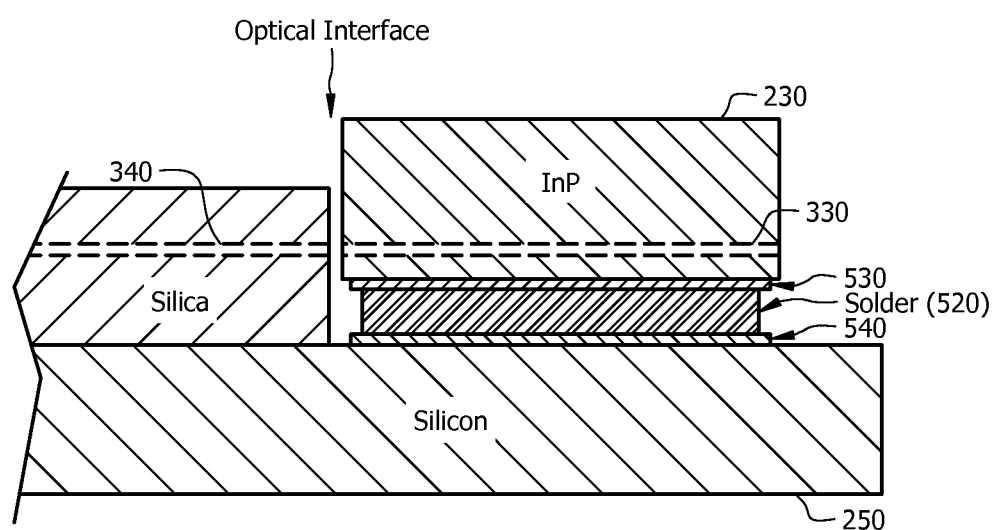
FIG. 7 is yet another schematic diagram showing a cross-sectional view of an assembly.

FIG. 7 is another view taken along the solder plane shown in FIG. 5. As shown in FIG. 7, the modulation block 230 may be mechanically held together with the PLC carrier 250 by the solder 520. Specifically, a first bonding pad 530 patterned on the modulation block 230 may be coupled with a second bonding pad 540 patterned on the PLC carrier 250 via the solder 520. In an embodiment, to provide good thermal conductivity between the modulation block 230 comprising InP and the PLC carrier 250 comprising silicon, the silica may be etched all the way to the silicon layer, so that no silica layer remains. Since the thermal conductivity of silicon is better than silica, this configuration may prove useful in case temperature control of the assembly is needed. Otherwise, silica etching may stop at any level (e.g., the same level with areas supporting the RF electrode connections, along the MZM exit plane, as shown in FIG. 5).

Flip-chip bonding of the modulation block 230 on the PLC carrier may offer good thermal stability in comparison to other bonding methods or approaches. For example, although a Butt joint method may be used to form the optical interface via active alignment, as the modulation block 230 may need to be repeatedly detached from the PLC carrier 250 during alignment, the Butt joint method may be thermally less stable compared to flip-chip bonding. The thermal stability may be important in some devices, e.g., where a precise path difference between two MZMs must be kept to maintain a fixed phase difference, such as in QPSK modulation.

Figure 8:
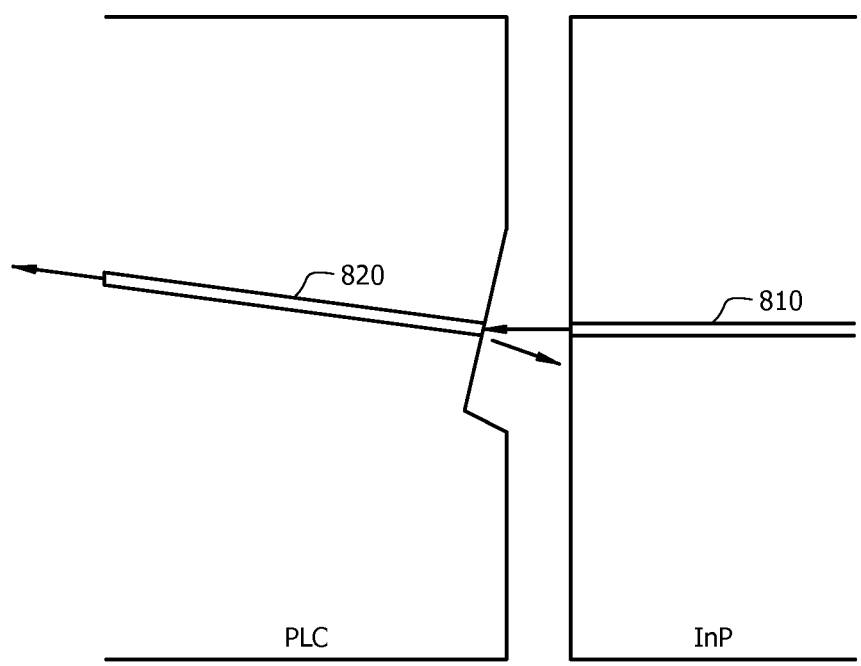
FIG. 8 is a schematic diagram showing an optical interface between a first waveguide and a second waveguide.

Mode convertors may sometimes be needed for both the modulation block 230 and the PLC carrier 250, in order to ensure good optical coupling at the optical interface. FIG. 8 is a schematic diagram showing an optical interface between a first waveguide 810 and a second waveguide 820. The waveguide 810 may be inside a modulation block, and the waveguide 820 may be inside another modulation block or an optical network component. The waveguides 810 and 820 may be substantially similar with waveguides described previously, except that the direction of the waveguide 820 is tilted to create a horizontal misalignment with the waveguide 810, as shown in FIG. 8. The misalignment causes a direction of the waveguide 820 to be different from a direction of the waveguide 810. The misalignment angle may be greater than zero but less than 45 degrees, less than 30 degrees, or less than 15 degrees. As a result, an exit facet of the waveguide 820 may no longer face perpendicularly to an exit facet of the waveguide 810. This configuration may help reduce or minimize optical reflection from the etched PLC facet at the optical interface. For example, when an optical signal travels from the waveguide 810 to the waveguide 820 through an air gap, the optical signal may be partially reflected upon entrance into the waveguide 820, with horizontal tilting, the optical reflection at the etched interface may be directed away from the optical path.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, ..., 70 percent, 71 percent, 72 percent, ..., 95 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a modulation block comprising a plurality of modulators, wherein the plurality of modulators comprises a first modulator at least partially folded within a second modulator,
wherein each of the plurality of modulators comprises an optical input port and an optical output port,
wherein all of the optical input ports and all of the optical output ports are positioned on one face of the modulation block,
wherein the first modulator comprises a first optical input port and a first optical output port and the second modulator comprises a second optical input port and a second optical output port, and wherein partially folded means that the first optical input port, the first optical output port, or both are located between the second optical input port and the second optical output port on the one face.

2. The apparatus of claim 1, wherein the modulators are Mach-Zehnder modulators (MZMs).

3. The apparatus of claim 2, wherein each of the MZMs further comprises Indium Phosphide (InP).

4. The apparatus of claim 2, wherein each of the MZMs further comprises a waveguide connected to the optical input port, and wherein the waveguide comprises a curved section.

5. The apparatus of claim 2, wherein each of the MZMs further comprises one or more electrical connections, and wherein all of the electrical connections are positioned on another face of the modulation block.

6. An apparatus comprising:
a modulation block comprising:
  a first plurality of markers; and
  one or more Mach-Zehnder modulators (MZMs), wherein each MZM is coupled to an optical input port, an optical output port, and at least one electrical input, wherein all of the optical input ports and all of the optical output ports are positioned on a first side of the modulation block, and wherein all of the electrical inputs are positioned on a second side of the modulation block that is parallel to the first side;
an optical interface;
a planar lightwave circuit (PLC) carrier comprising:
  a second plurality of markers; and
  a plurality of stoppers comprising first portions and second portions, wherein the first portions are etched and configured to provide electrical interfaces with the modulation block, and wherein the second portions are etched deeper than the first portions and configured to provide thermal interfaces and mechanical interfaces with the modulation block; and
a PLC monolithically grown on the PLC carrier and optically coupled to the modulation block via the optical interface.

7. The apparatus of claim 6, wherein the PLC comprises a passive optical network component.

8. The apparatus of claim 6, wherein the modulation block is coupled to the PLC carrier.

9. The apparatus of claim 8, wherein no electrical input overlaps any optical component positioned on the PLC carrier, and wherein the PLC is further coupled to the modulation block via flip-chip bonding.

10. The apparatus of claim 8, wherein at least one of the optical output ports is offset from a PLC optical input port by an angle greater than zero and less than 30 degrees.

11. The apparatus of claim 8, wherein the modulation block comprises a first waveguide, wherein the PLC comprises a second waveguide coupled to the first waveguide via the optical interface, and wherein the plurality of stoppers are configured to align the modulation block such that the first waveguide and the second waveguide have equal vertical positions at the optical interface.

12. The apparatus of claim 11, wherein the first plurality of markers and the second plurality of markers are configured to align the modulation block to the PLC carrier such that the first waveguide and the second waveguide have equal horizontal positions at the optical interface.

13. The apparatus of claim 11, further comprising at least one additional modulation block coupled to the PLC carrier.

14. The apparatus of claim 1, further comprising:
a planar lightwave circuit (PLC) carrier;
a first termination resistor deposited on the PLC carrier and associated with the first modulator; and
a second termination resistor deposited on the PLC carrier and associated with the second modulator.

15. The apparatus of claim 1, further comprising a planar lightwave circuit (PLC) carrier, wherein the PLC carrier comprises a first plurality of markers and the modulation block comprises a second plurality of markers.

16. The apparatus of claim 15, further comprising a PLC monolithically grown on the PLC carrier, wherein the PLC comprises a first waveguide and the modulation block comprises a second waveguide.

17. The apparatus of claim 16, wherein the first plurality of markers and the second plurality of markers are configured to align the modulation block to the PLC carrier such that the first waveguide and the second waveguide have equal horizontal positions.

18. The apparatus of claim 6, wherein the one or more MZMs comprises a first MZM, and wherein the apparatus further comprises a first termination resistor deposited on the PLC carrier and associated with the first MZM.

19. The apparatus of claim 18, further comprising:
a bonding pad coupled to the first termination resistor;
a transmission line coupled to the modulation block; and
a solder coupling the bonding pad to the transmission line.

20. The apparatus of claim 6, wherein the first portions are etched to silicon dioxide ($SiO_2$) layers and the second portions are etched to silicon (Si) layers.

* * * * *